(12) United States Patent
Hansen

(10) Patent No.: US 7,369,045 B2
(45) Date of Patent: May 6, 2008

(54) MONITORING SYSTEM AND DEVICE FOR AN ELECTRIC POWER LINE NETWORK

(76) Inventor: Roger Hansen, Hemsveien 14, N-3090 Hof i Vestfold (NO)

( * ) Notice: Subject to any disclaimer, the term of this patent is extended or adjusted under 35 U.S.C. 154(b) by 100 days.

(21) Appl. No.: 10/530,355

(22) PCT Filed: Oct. 7, 2003

(86) PCT No.: PCT/NO03/00334

§ 371 (c)(1),
(2), (4) Date: Dec. 30, 2005

(87) PCT Pub. No.: WO2004/038891

PCT Pub. Date: May 6, 2004

(65) Prior Publication Data

US 2006/0125469 A1   Jun. 15, 2006

(30) Foreign Application Priority Data

Oct. 7, 2002   (NO) .................................. 20024833

(51) Int. Cl.
*G08B 1/08* (2006.01)
(52) U.S. Cl. ................. 340/538.16; 340/635; 340/657; 333/24 R; 375/258
(58) Field of Classification Search ................. 340/635
See application file for complete search history.

(56) References Cited

U.S. PATENT DOCUMENTS

| 4,158,810 | A |   | 6/1979  | Leskovar |
| 4,268,818 | A | * | 5/1981  | Davis et al. ........... 340/870.38 |
| 4,360,881 | A |   | 11/1982 | Martinson |
| 4,420,752 | A | * | 12/1983 | Davis et al. ........... 340/870.17 |
| 4,728,887 | A |   | 3/1988  | Davis |
| 4,806,855 | A |   | 2/1989  | Davis |
| 5,140,257 | A |   | 8/1992  | Davis |
| 5,341,088 | A |   | 8/1994  | Davis |
| 6,097,298 | A |   | 8/2000  | Davis |
| 6,229,451 | B1 |  | 5/2001  | Brown |

FOREIGN PATENT DOCUMENTS

WO         95/35478      12/1995

* cited by examiner

*Primary Examiner*—George Bugg
(74) *Attorney, Agent, or Firm*—Wenderoth, Lind & Ponack, L.L.P.

(57) ABSTRACT

A device is provided for monitoring an electric overhead line, which device is constituted by an independently operating real time multisensor for mounting in a position on a span of the overhead line. The device has a built-in transmitter for transmitting sensor signals to a remote central, and comprises a laser range finder for measuring distance to the ground beneath the overhead line, as well as a camera for visual inspection of the line and its surroundings.

11 Claims, 5 Drawing Sheets

Figure 1:
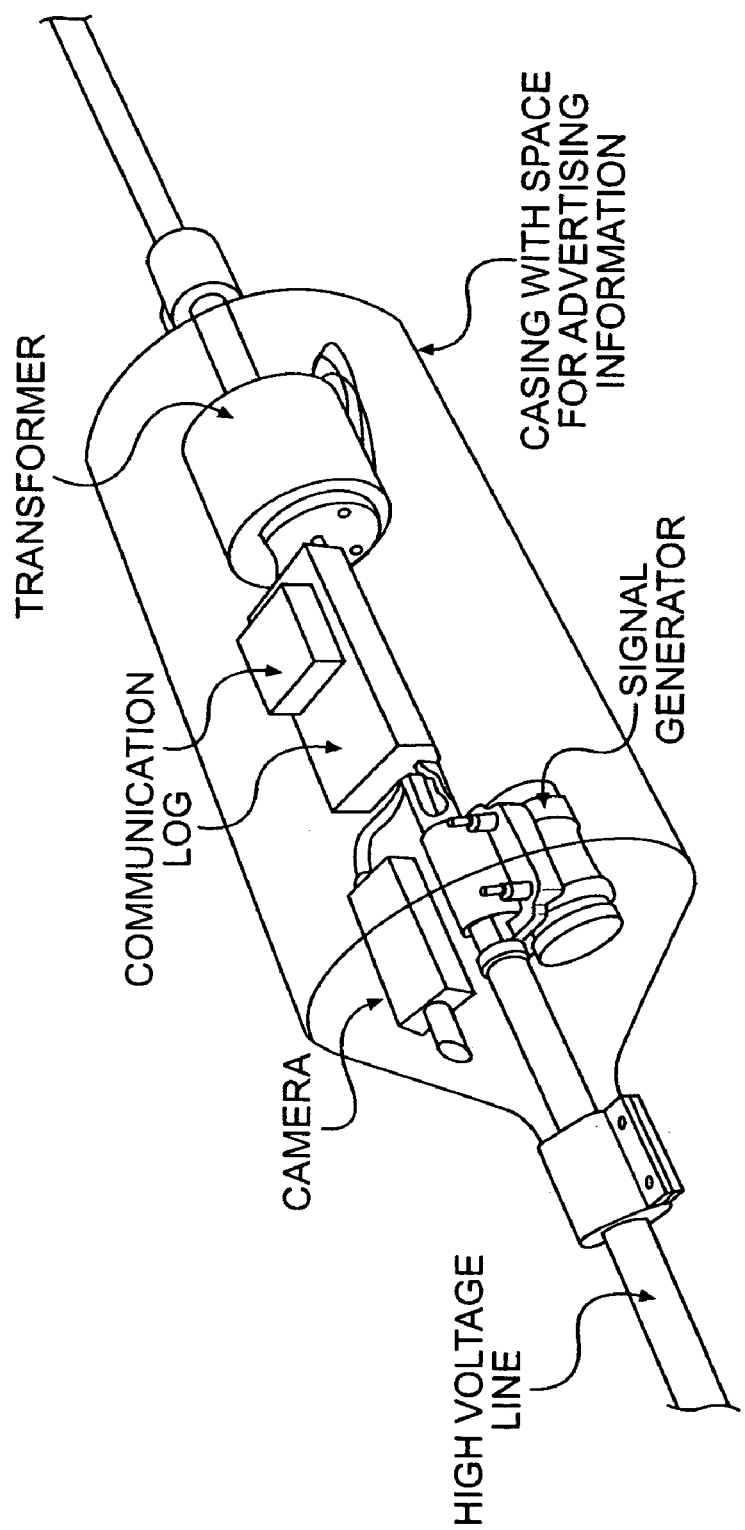

THE CURRENT TRANSFORMER IS IN TWO PARTS, SO AS TO MAKE INSTALLATION ON THE POWER LINE SIMPLE AND RAPID.

THE CURRENT TRANSFORMER IS IN TWO PARTS, SO AS TO MAKE INSTALLATION ON THE POWER LINE SIMPLE AND RAPID.

THE CURRENT TRANSFORMER IS IN TWO PARTS, SO AS TO MAKE INSTALLATION ON THE POWER LINE SIMPLE AND RAPID.

MONITORING SYSTEM AND DEVICE FOR AN ELECTRIC POWER LINE NETWORK

The present invention relates to a device for monitoring an electric overhead transmission line.

Power lines for transmission of electric power are dimensioned for the amperage to be transmitted, and for the length of the line spans in question. In addition, due consideration must be taken with regard to exposing the line span to wind, as well as the weighing down by snow and ice in northern areas.

It is a general physical fact that electric current flowing through a line will heat the line, and the degree of heating is connected with the amperage. Overheating leads to an expansion of the metal in the power line, and as a consequence of this, the power line will experience a sag increase, which means that the distance to ground level is decreased, possibly past a predetermined safety distance/minimum distance. In certain cases, strong heating for instance due to a large amperage, may give a situation where it is unsafe to stay underneath the power line.

In the warm season, and particularly in warm world regions, the power lines may become strongly heated by the sun and by a generally high air temperature, and if currents are then transmitted with amperages approaching the maximum amperage for which the line is designed, the wire may experience such a large sag increase that it will be perilous to enter the area thereunder. Also in other areas the increase of sag for the power lines in summer, may cause that the distance to trees thereunder will be too short. This may cause a flashover from the power line to the trees, and may result in forest fires and electrical power failure.

In other words, the power network companies may experience the problem that it is difficult to transmit the energy amount that the power line was actually constructed for.

In areas where power is delivered from nuclear power plants and thermal power plants, which plants have a laborious and slow manner of regulating the power production, the consequence is that it is difficult to transmit a high amount of energy just when the need is at the greatest. This leads again to the consequence that power suppliers and energy companies lose large amounts of money every year.

The power suppliers have no commercially accessible solutions for surveillance of the line network with regard to avoiding the above mentioned problems. Hence, a power supplier may be under the delusion that the energy transmission takes place in accordance with statutory safety routines and with the necessary safety margins, but has in reality no control over ambient temperature, solar heating etc. that in reality will determine the transmission capacity of the line.

The problem can be solved by building more power lines and stronger power lines, which may give a possibility to increase the safety margins, but this is a rather lengthy and costly process, and in addition, it is difficult to get a concession for new line profiles. Therefore, this solution is not of interest in most cases.

One is aware that a system has been developed for determining the temperature in a power line through measuring air temperature, and considering possible cooling effect of wind or rain. Thereby it is supposedly possible to calculate the amount of energy that can be transmitted at any time without any danger of overload. This calculating method has been taken in use in many countries, and provides a tool for the power plants for determining transmission capacity hour by hour. The method is based on weather forecasting and mathematical treatment of expected meteorological data in areas where the power lines are situated. As everybody knows, meteorological data are more or less reliable. The method has, naturally, turned out not to be sufficiently reliable with regard to the needs of the power companies.

From U.S. Pat. No. 5,341,088 is previously known a multisensor device that is mounted in a position on a power line span in order to perform real time monitoring of line temperature, air temperature, line current, solar irradiation, wind speed, wind direction and line slope at the multisensor position. From the slope, the multisensor calculates the line span sag, i.e. how low the lowest point of the line span lies below the suspension points. Measurement data regarding calculated sag and other parameters are transmitted via radio to an operation central that may make decisions regarding continued operation, on the basis of the measurement data.

However, the prior art as represented by the above mentioned U.S. Patent, is not always capable of providing a correct picture of the situation. If for instance snow and ice load occurs on a line span, the calculation from slope to sag will be erroneous, and besides, a snow layer of for instance 2 m on the ground underneath the line, or possibly vegetation growing rapidly, will result in quite different actual distances between line and terrain, than what the prior art will calculate from the measurements.

The present invention aims at solving the above mentioned problems. The solution in accordance with the invention is a device for monitoring an electric overhead line, and the device is defined precisely in the appended claim 1. Favourable and preferable embodiments appear from the attached claims 2-11.

In short terms, it can be expressed that the combination of a laser range finder directed downwards and camera surveillance, will provide exact distance to the ground as well as a visual confirmation of the situation. Further, it is an important novelty to be able to detect and provide a warning regarding power line galloping, by means of measurements with "inversely" mounted mercury switches for detecting "inverted sag" (verified by laser range finder and camera). Sideways galloping due to strong wind can also be detected in a similar manner.

Hence, the present invention provides the possibility of real time regulating of maximum transferable power, since it will be possible to monitor continuously from a power plant the condition of the power lines in question, so that overload, forest fire and dangerous passage of persons can be avoided, while at the same time capacity of the lines can be utilized at a maximum.

Figure 2A:
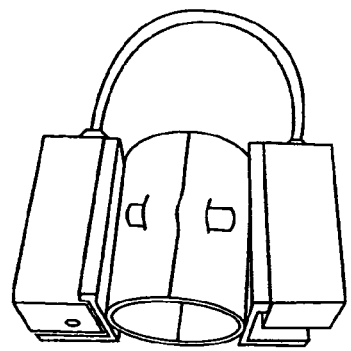
Figure 2B:
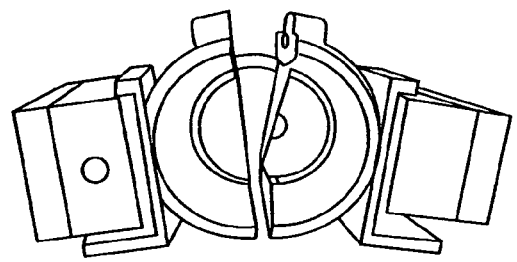
Figure 2C:
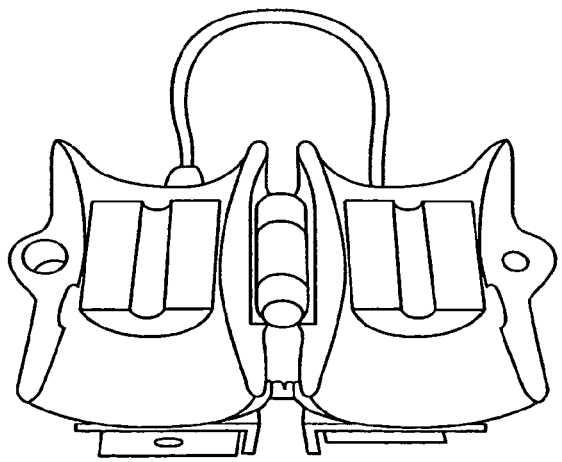
Figure 3:
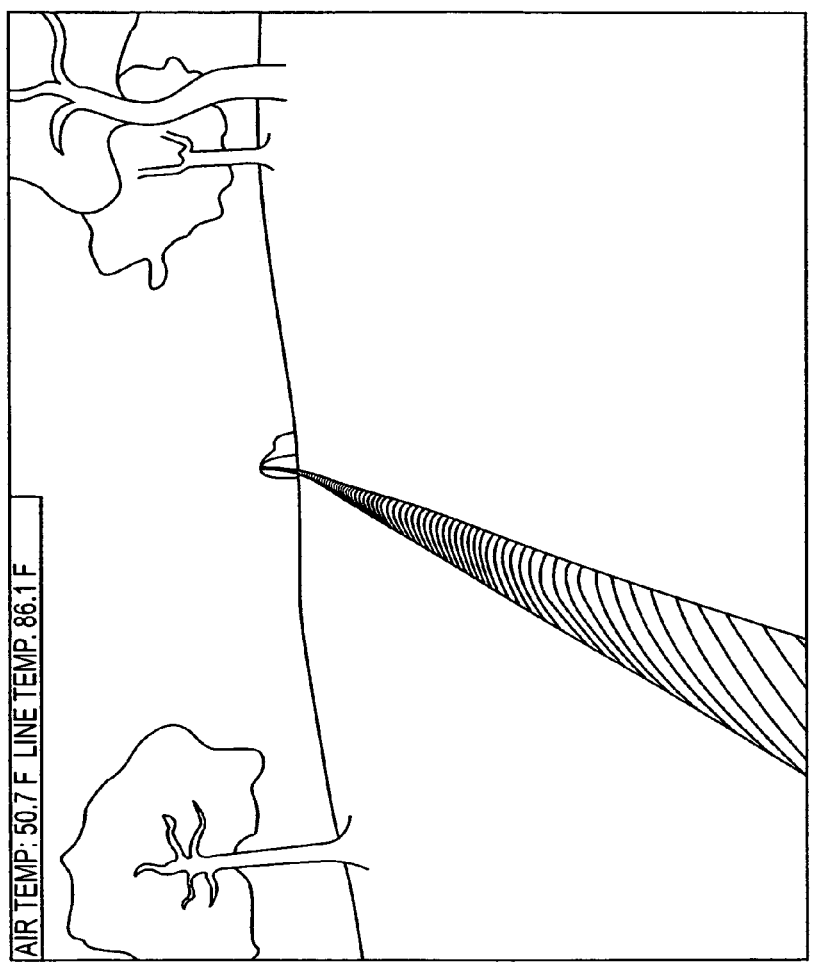
Figure 4:
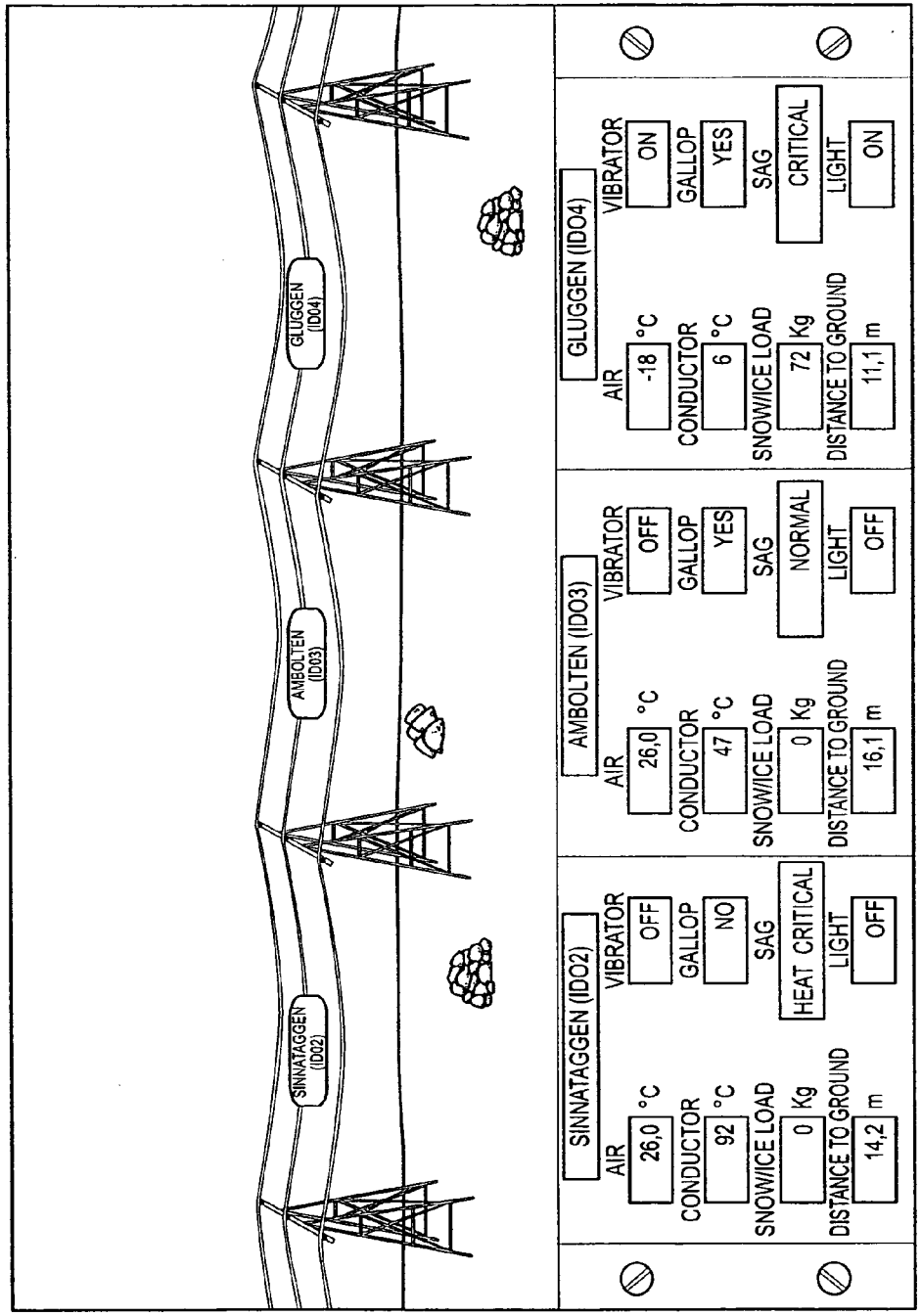
Figure 5:
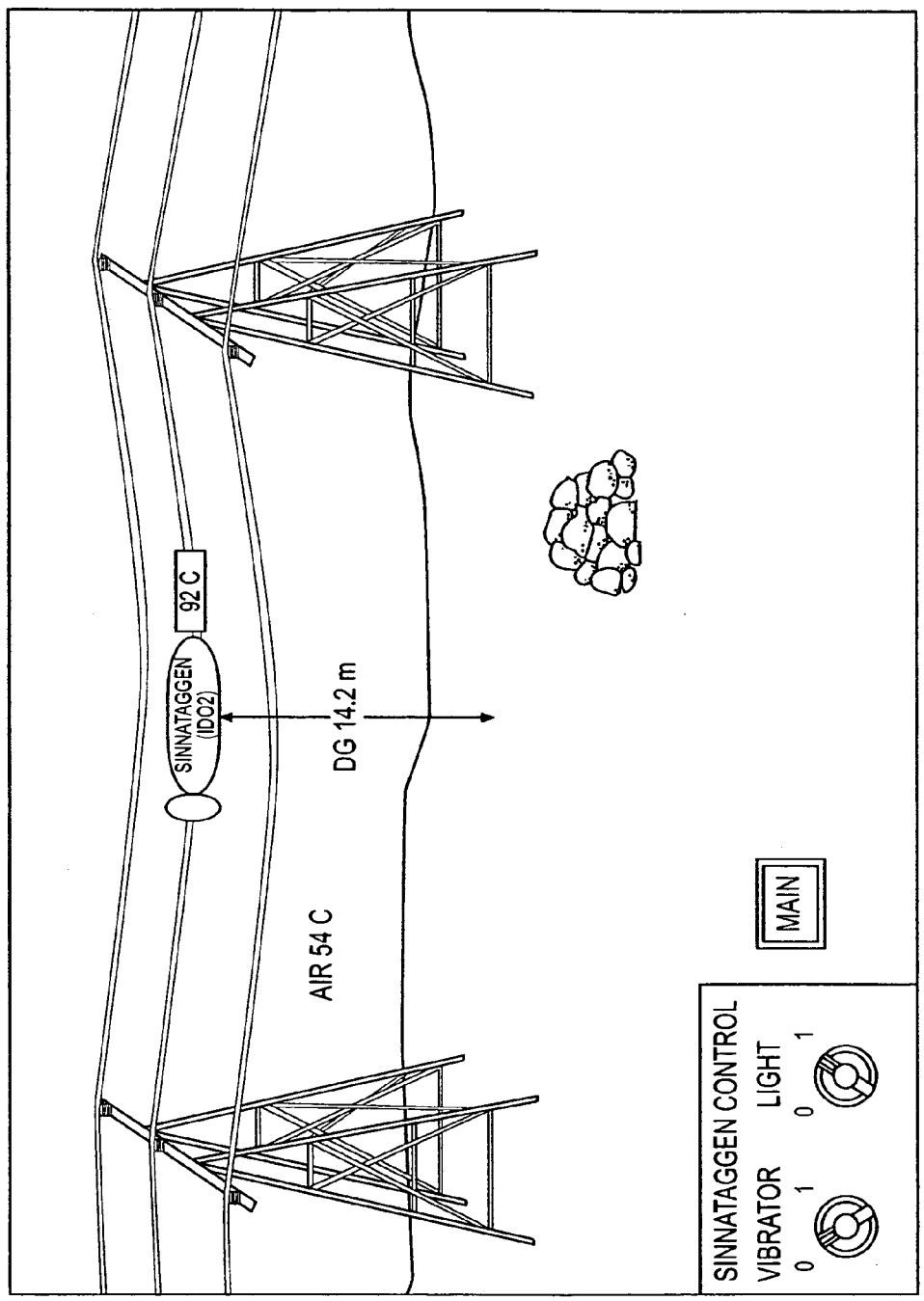

In the following, the invention shall be described more closely by going through some detailed embodiments, and with reference to the appended drawings, where FIG. 1 shows an embodiment of a device in accordance with the invention, mounted on an overhead line, and with an outer casing that is transparent for illustration purposes, FIGS. 2A-2C show an alternative embodiment of the device in accordance with the invention, having a "split" construction, FIG. 3 shows an example of an image from a camera included in the device in accordance with the invention, FIG. 4 shows one optional monitoring image on a computer display unit in an operation central, and FIG. 5 shows another optional monitoring image.

As mentioned above, one of the aspects of the invention consists in a device that can be designated as a "multisensor" that is able to detect, and output signals regarding, a plurality of parameters that are of importance for power lines. In a particular case, it is not necessarily important to monitor all parameters, but some of the parameters mentioned here, will always be of interest: it concerns line temperature, which is measured by a probe that engages the line itself, air temperature to be measured by a probe directed outward into the air, line slope or line sag increase, galloping, wind speed, wind direction, concentration of precipitation particles in the air, distance to ground level, quality of line current, snow/ice load on the line, and a visual image of the line.

Increase of line sag ("sagging") is measured by detecting a slope angle, for instance by means of mercury switches. Sag increase can be due to various factors, such as previously mentioned. If the sag increase measurement is set in connection with a temperature measurement, snow and ice load can be determined. The quality and stability of current flowing in the line can be measured by means of a measurement transformer, while wind speed and wind direction are measured by means of a traditional wind gauge. The distance to ground level is measured separately by means of a built-in laser range finder. The concentration of raindrops or snow particles in the air can be measured by a laser particle counter that comprises a mirror for a light fan from a laser. Rain and snow have a cooling effect on a line, and such a cooling influence is a factor that must be included in a prognosis.

In addition, the multisensor includes "visual safety backup" by having mounted therein a camera that can be used to see visually the various warning signals. Besides, the camera has an independent function for monitoring the line itself, weather conditions around the line and vegetation below the line.

Warning regarding "galloping line" has been mentioned above, and this means a warning regarding a damaging phenomenon for a line, namely a vibration mode in which a waveform propagates along the line, usually started by wind. A propagating wave, or for that matter a standing wave, along the line may have amplitudes large enough to result in damage. It is therefore important to detect such a motion, i.e. receiving an automatic warning regarding such a motion from a sensor device in accordance with the invention, because then the current can be shut down before destruction occurs, and the damage can then be limited.

As regards automatic warning signals, so-called "critical" sag can be mentioned, which means that the sag increases beyond a previously set criterion. When this situation is signalled as an automatic warning from the sensor device in accordance with the invention, the amperage can be reduced if the increased sag is due to heat in the line. Or some action can be started to remove possible snow/ice load from the line span if weighing down should be the cause of the exaggerated sagging.

It is referred to FIG. 1, where a preferable embodiment of a device in accordance with the invention appears, mounted on an overhead line. For illustrative purposes, the outer casing is transparent.

The device is attached tightly to the high voltage line and surrounding the line. Inside a weather-proof outer casing, made for instance of a strong plastic material, there are instruments of the above mentioned types: a camera is arranged so as to peer out through a window with a field of view along the line and preferably below the line. A transformer is arranged to collect operating power from the very current through the line, and in connection with this power transformer there is also a measurement transformer for checking the stability and quality of the line current. In a separate box, sensors/signal generators are arranged for sag measurement, in the form of mercury switches. In the same generator box there is also circuitry for generating signals regarding temperature in the line and the surrounding air, respectively, and these signals are generated on the basis of measurement signals from temperature probes engaging the line itself, and outside the outer casing.

In the shown embodiment, the multisensor device also contains a log for recording measurements, as well as a communication unit, which unit is, in the preferred embodiment, able to perform two-way communication. This means that the unit, in addition to transmitting radio frequency signals to a remote central, is also capable of receiving control signals from the same central.

The preferred embodiment also comprises a wind gauge, which is not visible in the drawing. The wind gauge operates of course in connection with an opening in the outer casing. A laser range finder is incorporated in the signal generator box, and measures the distance to the terrain below, through a window in the outer casing.

For the rest, the outer casing comprises, in the preferred embodiment of the device, space for outside information or advertisement.

In FIGS. 2A-2C appears an alternative embodiment of the device in accordance with the invention. In this embodiment it appears that a central section that contains a current transformer for fetching operating power from the magnetic field of the power line, is divided in two so as to make the installation on the power line simple and rapid. The two box-like units on the sides contain single sensors of the above mentioned types, there is for instance an opening shown in the front left side for an internal camera, and in addition there is communication equipment and a possible logging means.

In FIG. 3 appears an image recorded by a camera built into a device in accordance with the invention, which image shows the situation around the line such as it would appear visually, and in addition a bar has been laid in at the top of the picture, to show the temperatures of the air and of the line. Such an image can be transmitted as a radio signal.

As previously mentioned, the device in accordance with the invention constitutes a multisensor, which means that the device is able to measure a number of different parameters, but the device can also be specially adapted to deal with fewer parameters, or possibly more parameters, depending on the conditions in the actual location. What is regarded as minimum equipment in the sensor, are a slope gauge and temperature probes for air and line temperatures, laser range finder and camera. The slope gauge, preferably in the form of a mercury switch or relay with a ball (ball relay), provides information regarding sag, namely when the slope angle changes and becomes steeper, and the temperature probes provide information regarding the reason for the possible sag increase, namely either overheating of the line, or ice/snow load at low temperatures. The temperature probes are preferably bimetallic temperature probes. Correct distance to structures below the line, is measured directly by a laser range finder, and the measurement is double-checked by the camera surveillance.

The remaining sensor types that have been mentioned, are optional. Transmission equipment is obligatory, but receiver equipment for receiving control signals, should preferably be included also.

A simple and effective design of the multisensor can work in the following exemplary manner: bimetallic temperature probes are connected in series with slope angle gauges, for instance in the form of mercury switches. The mercury switches operate by forming contact, or breaking contact, depending on the inclination of the switch. Thus, the mercury switches are mounted in the multisensor with adjustment screws so that a default angle can be adjusted, and then in such a manner that contact is formed or broken for a certain angle of inclination. In other words, with this type of slope gauge it is detected only whether the angle of inclination is above or below a certain limit angle. However, several such gauges can be mounted if it is desirable to have detection ranges of finer graduation.

Since the multisensor in accordance with the invention shall always measure the slope of the line, the sensor must be mounted at a proper distance from the mid-point of a span, because at mid-point the slope will normally be equal to 0, no matter how much the sag is increased. This means that the sensor can advantageously be mounted in an area midway between a pylon and the mid-point of the span, or possibly even closer to the pylon.

One or several mercury switches/slope gauges for detecting change in sag, were mentioned above. In a practical case, the preferable number could be two such gauges, namely one regarding "50%" of a critical value, and one further mercury switch for the critical value itself.

In order to distinguish between cases of increased sag for the line caused by snow loads and caused by high line temperature, functions have been built in to set threshold values for line temperature in beforehand. If the line sags to a detection value, and the line temperature is for instance lower than a certain pre-set temperature threshold value, the sensor will provide a signal indicating snow/ice load. On the other side, the sensor will be able to provide a signal regarding increased sag due to exaggerated heat in the line, if a line temperature is detected that is higher than a pre-set threshold value. Hence, it is realized that the sensor in such a case transmits a signal of interest based on two conditions detected at the same time.

With the camera mounted in the sensor device, it will possible to verify the signal in question, via the camera.

Also a signal regarding a galloping line is obtained on the basis of the same technical solution, using for example a mercury switch as a slope gauge, but then a mercury switch which is turned 180° relative to the above mentioned mercury switches. Thus, the galloping detector responds to an inverse slope of the line, which is typical for the galloping phenomenon. Since this phenomenon is of a rapid and transient type, measures are preferably made to avoid that a galloping signal arises and disappears in step with the galloping. Therefore, a relay is mounted and set for a desired, timed hold contact, or the signal must be signed out. Hence, greater security is obtained regarding detecting an incoming galloping signal in the central.

Besides, galloping may occur in two perpendicular planes, namely mostly in the plane spanned by the line span itself, which is a vertical plane, but the oscillations may also occur in a horizontal plane. Experiments show that galloping in both planes can be detected by means of one and the same mercury switch.

The laser range finder checks continuously the distance from the line to the ground level, and consequently the remaining signals regarding line deviations, i.e. increased sag and possible galloping, can be verified.

To ensure that the previously mentioned sensors work properly, it is important that the multisensor does not twist around the line. The sensor should therefore be attached firmly from the start, but in addition, if the line itself is exposed to twisting movements about its axis, the sensor could be equipped with a cylindrically rotatable suspension to ensure that the multisensor stays at rest relative to a vertical plane, i.e. that it does not rotate relative to the surroundings.

It is a separate point regarding the multisensor, that different measuring methods used at the same time, in collection will provide a reliable result. In the embodiment where a current transformer is used to provide energy from the power line itself, there will be no particular limitations regarding the energy demand of the sensor. In another embodiment adapted for power lines that do not transmit high voltage power, it is possible to use the actual current from two phase leads running in parallel next to the sensor device, in such a manner that the very current in the lines is used for powering the sensor. In another embodiment, for example adapted to telecommunications lines, power current can be supplied separately via the nearest pylon carrying power current.

The sensor device preferably has transmitter modules for every signal to be transmitted. Preferably, it also contains a receiver system, so that it will be possible to activate the camera for visual inspection, or to activate other single sensors in order to double-check signals that have been received in the central. All signals are transmitted via the power company's own data system, which system is based on for instance the RTU system, possibly the Scada system, or using RF signals. All signals are logged. The central receives the signals and can make decisions regarding transmission of more or less power through the lines where the sensor devices are mounted. Because the sensor devices transmit signals to the central, where the signals are logged, it is possible to implement measures prior to a possible breakdown. As an example, it can be mentioned that if the control room receives a signal to the effect that a line span is galloping, this provides an opportunity to load power over to another power line before the first one breaks down, and in such a manner it will be possible to avoid power shut-off for some areas.

Further, the logging of the signals will provide a possibility for preparing trends and statistics for the various power lines where the system is mounted, so that it will be possible to have documented statistics based on real time measurements.

Since the system of the invention is based on real time measurements on the lines, the decisions that are made in the central on the basis of the sensor signals, will always be correct.

Regarding information/advertising on the outside of the multisensor outer casing, the pricing of the power company may appear there, or possibly the power amount that is transmitted through the line. Such an information device could of course be developed further to be able to display variable information, particularly in a context as previously mentioned, where operating power can be taken from the line itself. In such a case, operating a variable display is no problem. This may be of special interest for instance where power lines cross communication arteries like for instance roads or canals.

FIG. 7 shows a possible monitoring picture on a computer display unit in an operation central. In the top part of the image, the monitored power line is identified. It is realized that this power line extends from location Røykås to location Fåberg, and it is a 300 kV line. Multisensor devices in accordance with the invention have been arranged in three special positions, namely position "Sinnataggen" with identification ID02, position "Ambolten" (ID03) and position "Gluggen" (ID04), and it is noted that the three locations would normally have been selected with a spacing of about 10 km. (In the drawing, it looks as if the three locations are in adjacent line spans, but this is merely a chosen visual design for the display picture.)

In the lower part of the display picture, the respective multisensor devices have their own areas with indications regarding important parameters.

Thus, if measurement parameters are considered for location "Sinnataggen" at the far left, one finds a measured air temperature of 54° C., a measured conductor temperature of 92° C., a measured snow/ice load of 0 kg and a measured distance to the ground that is 14,2 m. The measured temperatures and the distance to ground shows clearly that heat expansion has resulted in increased sag ("Sag") so that the distance to the ground is too short, and there is an indication "Heat Critical" just below "Sag" in the right column. The air temperature indicates clearly that the line is in a very warm area (here maybe excessively warm), and it seems clear that a shut-down must be executed.

The other indications in the right column under "Sinnataggen", are that a vibrator means that may be attached to the overhead line together with the multisensor device, or near the multisensor device, is shut off. The next indication is that there is no "galloping" condition for the line, and at the bottom there is an indication that a light source for the multisensor device camera is off.

If one takes a look at the location "Ambolten" at the middle of the page, somewhat more normal conditions will be found, the distance to ground being acceptable, namely 16,1 m, there is no snow or ice load, the conductor temperature is acceptable at 47° C., and the temperature is 26° C. It is not necessary with light for the camera, nor is it necessary with any vibrator operation to remove snow or ice. However, there is an indication of a galloping line. This may be a problem in its own right, started by a strong wind. Possibly, a camera picture should be used, so that an operator may decide whether the galloping condition is dangerous.

In the display part regarding position "Gluggen" at the far right in the picture, it is realized that position "Gluggen" would necessarily be relatively far away from "Sinnataggen" at the far left. The conditions at position "Gluggen" are winter conditions, the air temperature being −18° C., a snow/ice load of 72 kg is detected, and this results in a sag increase that is critical, with a distance to ground of only 11,1 m.

At this position, there is also a need of light for the camera that is used to confirm the condition, and one can also see that a vibrator has been switched on, in order to try to remove snow and ice from the line. There is also detection of a galloping movement.

The three cases appearing in FIG. 4 will in a practical case hardly appear in the same picture, but merely state examples of what may possibly appear as indications in such an image.

It may be of interest to take a closer look at one of the indicated locations, and an operator may then click directly on the image indication of a multisensor device, for instance device "Sinnataggen" in FIG. 4. Thereby, a new image appears, like the one shown in FIG. 5. The layout in FIG. 5 is such as to show the measured parameters directly in an "actual position", for instance the conductor temperature appears as a mark on the line, i.e. 92° C., the distance to ground appears between the line and the ground as DG (Distance to Ground) 14,2 m, and air temperature appears "in the air" as "Air 54° C.". In FIG. 5 appears also a yellow (bright) mark next to the sensor device, which means active camera lights. In this special case, the light was supposed to be "off", but in FIG. 5 the bright marking that really means "camera lights on", appears just to show the indication itself.

In the lower part of the computer display picture shown in FIG. 5, appear control buttons that can be clicked, one for a snow/ice vibrator, which in this case is "off", and to the right a switch for camera lights, which in this case is "on". A clickable button ("main") is arranged in the display picture to provide a possibility to return to the main picture (i.e. the picture of FIG. 4).

In other words, one of the main tasks for the multisensor devices is to measure in real time the topical parameters that influence the ability of the power lines to maintain the function, that is conductor temperature, air temperature, sag, camera image with a general view and more, as mentioned above. These parameters are then transmitted as radio signals to an operation central, and are then deciding parameters regarding the transmission capacity of the line. The measurements from the multisensor device will also form a basis for the "rating" hour by hour for the line, i.e. it is desirable to determine with the real time measurements the transmission capacity of the power line with 100% certainty, hour by hour. (The reason for the time aspect "hour by hour" is the thermal inertia of the line.)

If it appears that the sag of the line becomes critical, the multisensor device will provide immediately an alarm for an operation central.

The invention claimed is:

1. A device for monitoring an electric overhead line, the device being an independently operating real time multisensor for mounting in a position on a line span, with a built-in transmitter for transmitting sensor signals to a remote central, from built-in sensors for sensing at least one parameter in a parameter group that comprises angle of inclination, line sag increase, wind speed, wind direction, quality/stability of line current, line temperature and air temperature, characterized in that the multisensor further comprises a camera for real time image monitoring of the line and its surroundings, the camera further being operative to present at least one of said parameters visually as a part of the camera image, the camera image being transmitted as a sensor signal in real time to the central.

2. The device of claim 1, characterized in that the multisensor further comprises a laser range finder for direct measurement of distance to ground right therebelow, said distance being included in said parameter group, and being presentable in the camera image that is transmitted.

3. The device of claim 1, characterized in that the multisensor further comprises bimetallic temperature probes, mercury inclination switches, ball relays, camera, wind gauge, laser range finder and a measuring transformer, for sensing said parameters and for optional display in the camera image that is transmitted.

4. The device of claim 1, characterized in that the multisensor is equipped with circuitry for providing a trigger function for transmitting an alarm signal when pre-set threshold values of temperature or others among said parameters are exceeded.

5. The device of claim 1, characterized in that the multisensor comprises a current transformer for fetching operating power from the overhead line itself.

6. The device of claim 1, characterized in that the multisensor comprises a system of solar cells and battery for providing operating power.

7. The device of claim 1, characterized in that the multisensor or a part thereof is shaped as two semi-cylinders hinged to each other, for mounting by folding the semi-cylinders together round the line.

8. The device of claim 1, characterized in that the outer surface thereof is equipped with visible information/advertising.

9. The device of claim 1, characterized in that the multisensor comprises a receiver for control signals from the central.

10. The device of claim 1, characterized in that the transmitter is a radio transmitter.

11. The device of claim 1, characterized in that the transmitter is connected to the power line itself, in order to use the power line as a transmission medium to the central.

* * * * *